J. ROBB.
Bee Hive.
No. 4,340.
Patented Dec. 31, 1845.
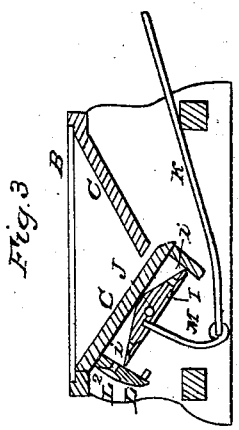
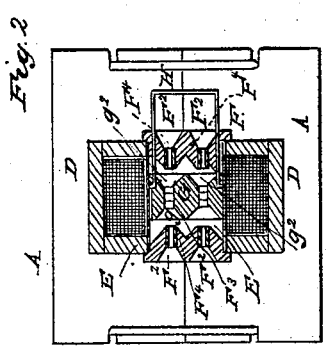
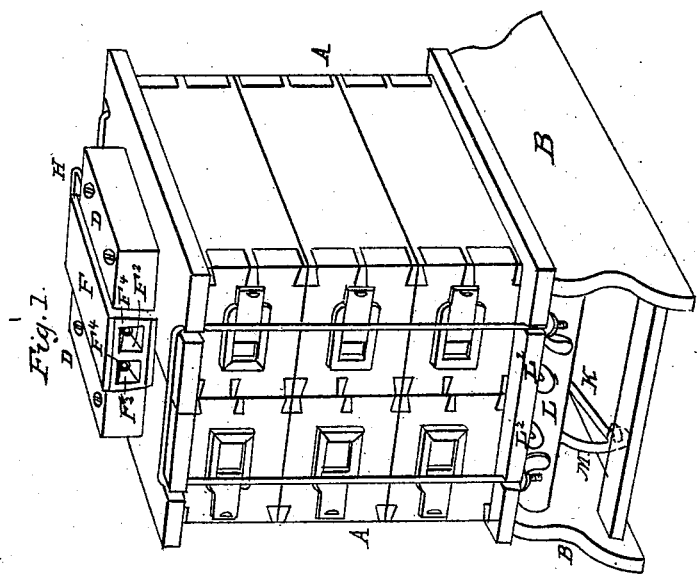

UNITED STATES PATENT OFFICE.

JAMES ROBB, OF LEWISTOWN, PENNSYLVANIA.

BEEHIVE.

Specification of Letters Patent No. 4,340, dated December 31, 1845.

*To all whom it may concern:*

Be it known that I, JAMES ROBB, of Lewistown, in the county of Mifflin and State of Pennsylvania, have invented a new and useful Improvement in the Construction of Beehives, which is described as follows, reference being had to the annexed drawings of the same, making part of this specification.

Figure 1 is a perspective view of the hive. Fig. 2 is a horizontal section of the moth trap. Fig. 3 is a vertical section of a moth trap.

This bee hive consists of two vertical ranges of rectangular boxes A placed side by side upon a base B having a bottom composed of two inclined boards C C inclining toward each other in the usual manner, there being a space left between the lower edge of one of said boards and the upper inclined surface of the other board for the ingress and egress of the bees as in other hives. In the sides of these boxes are made suitable openings for the passage of the bees from one range of boxes to the other, the openings in one range corresponding with those in the other range and provided with slide-valves for opening and closing said openings when required for any purpose. The operation of these boxes for separating the bees, colonizing them, preventing them from swarming, taking the honey without destroying the bees, &c., being similar to that of other hives, need not, therefore, be particularly described. In the top and bottom of each box of each range is an opening, the openings in the bottoms of the boxes corresponding with those in the tops of the contiguous boxes. The openings in the tops of the upper boxes are covered with reticulated wire or gauze to prevent the ascent of the bees and at the same time to permit air to circulate up through the boxes from the bottom to the top for the purpose of properly ventilating the hive. The aforesaid openings in the tops of the upper boxes are covered with square or rectangular domes D D having an opening E in the side of each dome next the center, which is also covered with wire gauze for the purpose of promoting the ventilation and for excluding insects. There is a rectangular space left between the said domes for the purpose hereafter described.

My principal improvement consists in the peculiar construction of a moth trap which I place in the aforesaid space between the domes. It consists of a rectangular box F having a bottom, top and two ends, and open sides. The open sides are placed opposite the open sides of the domes. Recesses $F^2$ with flaring sides are made in each end of the box. Correspondingly shaped projections $F^3$ are formed on the inner sides of the ends of the box, in the form of a pyramid whose axis is horizontal. Through the center of each recess and projection is made a horizontal round aperture into which is placed a horizontal tube $F^4$ for the entrance of the moth. In the central space of the box between these pyramidal shaped projections is made to move back and forth a rectangular block G, called "the crusher," recessed on either side with depressions $g^2$ corresponding in size and shape with the aforesaid pyramidal projections, which are made to fit into said depressions of the crusher G as the latter is drawn or pushed against them. When the crusher is drawn in one direction the projections on one side enter their corresponding depressions. And when the crusher is moved in an opposite direction the opposite projections enter their corresponding depressions. The crusher is provided with a handle H, by which it is moved back and forth by hand.

The operation of this trap is as follows: The warm air and sweet scent from the hive passes through the domes into the central box F. The moths are attracted by the warmth and sweet and induced to pass through the small horizontal tubes $F^4$ into the space occupied by the crusher. Then by drawing or pushing the crusher G to the right or left it crushes the moths against the inclined sides of the pyramidal projections $F^3$ and there is an end to them. The box F with the crusher is easily removed from between the domes in order to cleanse it.

A trap for destroying the moth is also arranged on the under side of the inclined bottom of the base B. It consists of a vibrating board I called the crusher, made to turn on pivots J by a handle K and to crush the moths between it and the inclined bottom of the base. In order to form a space between this crusher and the under side of the inclined bottom C to admit the moths and allow room for the crusher I to move, the vibrating board I is reduced in thickness from the middle toward the edges *i i*. The moths enter into said spaces through openings L² made in an inclined board L fastened lengthwise to the under side of one of the inclined boards of the bottom of the base. The under side of the vibrating cushion is made flat and with openings through it also to admit the moth. Into it are inserted two curved arms M. To the outer extremity of these arms is attached a bale handle K by which the bord is vibrated. The moths in endeavoring to find the entrance to the hive pass through the aforesaid small round apertures in the board into the space between the vibrating board and the base board, where they are caught and crushed by simply vibrating the board.

All that I claim in the before described hive is—

The construction of the sliding trap F G as aforesaid and the arrangement of the vibrating trap I as aforesaid for destroying the moth arranged and operated as set forth.

In testimony whereof I have hereunto subscribed my name this twentieth day of November, 1845.

JAMES ROBB.

Witnesses:
ALBERT E. H. JOHNSON,
JAMES D. MCCUTCHAN.